C. E. JACOT.
Stem-Winding Watch.

No. 101,881.

Patented April 12, 1870.

Witnesses:
Chas. H. Smith
Geo. W. Walker

Inventor:
Charles E. Jacot
per L. W. Serrell
Atty

United States Patent Office.

CHARLES E. JACOT, OF CHAUX-DE-FOND, SWITZERLAND.

Letters Patent No. 101,881, dated April 12, 1870.

IMPROVEMENT IN STEM-WINDING WATCHES.

The Schedule referred to in these Letters Patent and making part of the same.

*To all whom it may concern:*

Be it known that I, CHARLES E. JACOT, a citizen of the United States, now in Chaux-de-Fond, Switzerland, have invented, made, and applied to use, a new and useful Improvement in Means for Winding and Setting Watches; and I do hereby declare the following to be a full, clear, and exact description of the same, reference being had to the annexed drawing making part of this specification, wherein Figure 1 is an elevation, in enlarged size, of the said improvement; also showing portions of the works of the watch.

Similar marks of reference denote the same parts.

Figure 2:
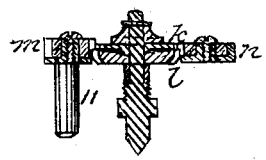
Figure 2 is a section at the line $x\,x;$.
Figure 1:
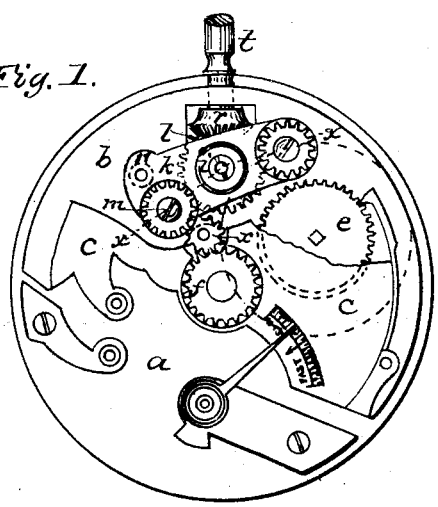
Figure 3:
Figure 3 is an inverted plan of the swinging-plate without the gear-wheels.

This invention is an improvement upon that for which Letters Patent were granted to me November 26, 1867, No. 71,389, and a reference is hereby made to the said patent for a more full and complete description of the construction and operation of those parts that occur or are shown in both the drawings, or that are named hereafter.

In the drawing the watch-plate $a$, secondary plate $b$, arbor-plate or bridge, $c$, spring-barrel $e$, minute-hand wheel $f$, intermediate wheel $x$, stem $t$, and bevel-pinion $r$, are all substantially the same as in the aforesaid Letters Patent, and require no further description.

Instead of having the plate $k$ between the bevel-gear $h$ and wheel $l$, as in said patent, the wheel $l$ is make with beveled teeth on one side, into which the wheel $r$ of the stem-winder gears, and the gear-wheel 10 of said patent is dispensed with, the wheel $m$ being made of the thickness necessary for gearing into the intermediate wheel $x$.

The plate $k$ is supported by and swings upon the stud $i$ that is screwed firmly into the plate of the watch, and between this plate $k$ and a shoulder on the stud $i$ is the wheel $l$.

The wheels $m$ and $n$ are upon the upper surface of the swinging-plate $k$, but in order to allow their teeth to gear into the teeth of the wheel $l$, the plate $k$ is recessed or formed with depressions that bring the wheels $m$ and $n$ down into line with the wheel $l$, and the circular recesses into which the respective wheels set, intersecting each other, produce openings that allow the teeth to gear together, but do not materially lessen the strength of the swinging plate $k$.

The stud 11, upon the swinging-plate $k$, is acted upon by a lever similar to the lever $y$ in said patent, or by any other convenient means, to bring the wheel $m$ into gear with the intermediate wheel $x$, so that the hands can be set by the stem $t$.

In the usual or normal position the wheel $n$ is in gear with the wheel of the spring-barrel $e$, so that the same may be employed in winding the watch.

It will now be apparent that by constructing the plate $k$ in the manner before described, the parts are rendered much less complicated and costly, and they are not liable to become injured in use.

I claim as my invention—

The swinging-plate $k$, formed with depressions on opposite sides for gears $l\;m\;n$ that gear into each other, in combination with the stud 11, and winding and setting mechanism, substantially as and for the purposes set forth.

In witness whereof I have hereunto set my signature this 15th day of October, A. D. 1869.

CHAS. E. JACOT.

Witnesses:
D. FER,
E. RAMSEYA.